United States Patent
He et al.

(10) Patent No.: US 11,675,427 B2
(45) Date of Patent: Jun. 13, 2023

(54) EYE TRACKING BASED ON IMAGING EYE FEATURES AND ASSISTANCE OF STRUCTURED ILLUMINATION PROBE LIGHT

(71) Applicant: Shenzhen Goodix Technology Co., Ltd., Shenzhen (CN)

(72) Inventors: Yi He, San Diego, CA (US); Bo Pi, San Diego, CA (US)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/549,863

(22) Filed: Aug. 23, 2019

(65) Prior Publication Data
US 2020/0064913 A1    Feb. 27, 2020

Related U.S. Application Data

(60) Provisional application No. 62/723,476, filed on Aug. 27, 2018.

(51) Int. Cl.
| | |
|---|---|
| *G06F 3/01* | (2006.01) |
| *G06T 7/246* | (2017.01) |
| *G06T 7/73* | (2017.01) |
| *G06T 5/00* | (2006.01) |
| *G01P 13/00* | (2006.01) |
| *G01B 11/00* | (2006.01) |

(Continued)

(52) U.S. Cl.
CPC ............ *G06F 3/013* (2013.01); *G01B 11/002* (2013.01); *G01P 13/00* (2013.01); *G06T 5/006* (2013.01); *G06T 7/246* (2017.01); *G06T 7/60* (2013.01); *G06T 7/73* (2017.01); *G06V 40/193* (2022.01); *G06T 2207/30201* (2013.01)

(58) Field of Classification Search
CPC ................... G06F 3/011–015; G06F 2111/18
See application file for complete search history.

(56) References Cited

U.S. PATENT DOCUMENTS

| | | | |
|---|---|---|---|
| 9,552,064 B2 | 1/2017 | He et al. | |
| 2011/0013007 A1* | 1/2011 | Holmberg | G06K 9/00604 348/78 |
| 2015/0070470 A1 | 3/2015 | McMurrough | |

(Continued)

FOREIGN PATENT DOCUMENTS

| | | |
|---|---|---|
| CN | 1960670 A | 5/2007 |
| CN | 101201695 A | 6/2008 |

(Continued)

OTHER PUBLICATIONS

International Search Report dated Oct. 24, 2019 for International Application No. PCT/CN2019/098028, filed on Jul. 26, 2019 (5 pages).

(Continued)

*Primary Examiner* — Sanghyuk Park
(74) *Attorney, Agent, or Firm* — Perkins Coie LLP (57) ABSTRACT

Disclosed are techniques and devices for optical eye tracking based on imaging the eye and tracking certain images of eye features in the eye. The disclosed techniques and devices can be implemented to use structured light to illuminate an eye for obtaining images of the eye to generate accurate eye movement information.

20 Claims, 6 Drawing Sheets

113-Structured probe light
115-Pupil of the eye
117-Signatured point in the eye iris
119-Edge of the eye iris
121-Signatured point on the eyeball surface
123-Distorted reflection image of a point illumination light source (51) Int. Cl.
*G06T 7/60* (2017.01)
*G06V 40/18* (2022.01)

(56) References Cited

U.S. PATENT DOCUMENTS

| | | | |
|---|---|---|---|
| 2015/0378431 A1 | 12/2015 | Donaldson | |
| 2016/0349514 A1* | 12/2016 | Alexander | G06F 3/013 |
| 2017/0109580 A1* | 4/2017 | Kaehler | G06T 7/60 |
| 2017/0123526 A1* | 5/2017 | Trail | A61B 3/113 |
| 2017/0231490 A1* | 8/2017 | Toth | A61B 90/37 |
| | | | 600/558 |
| 2017/0236304 A1 | 8/2017 | Kempinski et al. | |

FOREIGN PATENT DOCUMENTS

| | | |
|---|---|---|
| CN | 102496005 A | 6/2012 |
| CN | 102799277 A | 11/2012 |
| CN | 103383595 A | 11/2013 |
| CN | 103455147 A | 12/2013 |
| CN | 104067160 A | 9/2014 |
| CN | 105068646 A | 11/2015 |
| CN | 105070272 A | 11/2015 |
| CN | 106663183 A | 5/2017 |
| CN | 107427208 A | 12/2017 |
| CN | 107710048 A | 2/2018 |
| CN | 108351514 A | 7/2018 |
| JP | H09105609 A | 4/1997 |
| WO | 2014209821 A1 | 12/2014 |
| WO | 2015081325 A1 | 6/2015 |
| WO | 2016138969 A1 | 9/2016 |

OTHER PUBLICATIONS

Vandenhouten, et al., "Design and quality metrics of point patterns for coded structured light illumination with diffractive optical elements in optical 3D sensors", Digital Optical Technologies 2017, pp. 1-13.

Chinese Patent Office, First Office Action for CN Appl. No. 201980001974.2, dated Nov. 16, 2022, 26 pages with English translation.

Second Office Action mailed in Chinese application No. CN201980001974.2 dated Apr. 3, 2023.

* cited by examiner

100 Eye tracker user
101, 103-Platform for the eye tracker sensor
105-Signal receivers
107-Structured probe light projectors
109-Probe light beams
111-Viewing window

FIG. 1

113 - Structured probe light
115 - Pupil of the eye
117 - Signatured point in the eye iris
119 - Edge of the eye iris
121 - Signatured point on the eyeball surface
123 - Distorted reflection image of a point illumination light source

FIG. 2

125 - Grid pattern
127 - Spot pattern
129 - Coded speckle pattern

FIG. 3

131-Probe light sources
133-Probe light projectors
135-Structured probe light beams
137-Eyeball to be monitored
139-Signal detectors
141-Receiving optics
143-Field of view
145-Controller

EYE TRACKING BASED ON IMAGING EYE FEATURES AND ASSISTANCE OF STRUCTURED ILLUMINATION PROBE LIGHT

CROSS-REFERENCE TO RELATED APPLICATION

This patent document claims priority to, and benefits of, U.S. Provisional Patent Application No. 62/723,476, entitled "EYE TRACKING BASED ON STRUCTURED ILLUMINATION PROBE," filed on Aug. 27, 2018. The entire content of the above patent application is incorporated by reference as part of the disclosure of this patent document.

TECHNICAL FIELD

This patent document relates to eye tracking and eye sensing technologies.

BACKGROUND

Electronic devices rely on various user movements as input to perform different functions and to operate in various modes or states. For example, user gestures such as hand movements can be detected and translated into user control of a menu item or a game function. Similar to gestures, eye movements can be detected to perform scroll operations, to keep a screen turned-on, or to operate a heads-up-display. Additional devices and techniques are needed to replace traditional input methods.

SUMMARY

Methods, systems, and devices are disclosed for optical sensing and tracking of eye movement. The described methods, systems, and devices can be used to track the gaze or focus point of a user's eye or eyes by imaging the eye and tracking certain images of eye features in the eye. The disclosed techniques and devices can be implemented to use structured light to illuminate an eye for obtaining images of the eye to generate accurate eye movement information.

In one aspect, based on the disclosed technology, an eye-tracking device can be implemented to include a support structure attachable to the user; one or more probe light sources placed on the support structure to produce illumination probe light; an optical device placed on the support structure to receive the illumination probe light and to direct the illumination probe light to illuminate an eye of the user; an optical detector array placed on the support structure to include optical detectors to capture images of the eye under illumination to produce detector signals from the optical detectors; an optical imaging module placed on the support structure to image the eye onto the optical detector array; and a processor coupled to receive and process the detector signals from the optical detector array and operable to extract an optical image of a feature of the eye in each captured image of the eye and to monitor a change in position of the optical image of a feature of the eye in each captured image of the eye to track the eye.

In another aspect, the disclosed technology can be implemented to provide a method for using optical imaging to track an eye to include attaching a device to a user; projecting illumination probe light to illuminate an eye of the user; operating an optical detector array with optical detectors located in the device to receive the optical reflection of the illumination probe light with the spatial pattern from the eye under illumination to produce detector signals from the optical detectors representing a detected image of the received optical reflection; and processing the detector signals from the optical detector array to generate an optical image of the eye and to identify an optical image of a selected feature of the eye within the generated image of the eye and to monitor a change in position of the optical image of the selected feature of the eye in the generated image of the eye to track the eye.

In another aspect, an eye tracking device can be provided based on the disclosed technology. The eye tracking device includes a viewing device that can be attached to a user and is structured to include a display screen visible to the user when the view device is attached to the user. The device includes one or more probe light sources located in the viewing device to produce illumination probe light, and an optical device located in the viewing device to receive the illumination probe light and to produce a spatial pattern on the illumination probe light and to direct to the illumination probe light with the spatial pattern into an eye. The device further includes an optical detector array with optical detectors located in the viewing device to receive the optical reflection of the illumination probe light with the spatial pattern from the eye under illumination to produce detector signals from the optical detectors representing a detected image of the received optical reflection, and an optical imaging module located in the viewing device to collect the optical reflection of the illumination probe light with the spatial pattern from the eye under illumination and to image the collected optical reflection onto the optical detector array. The device includes a processor coupled to receive and process the detector signals from the optical detector array and operable to extract (1) an optical image of the spatial pattern reflected from the eye and (2) an image of the eye that overlaps with the optical image of the spatial pattern reflected from the eye, and to determine a position or motion of the eye with respect to the display screen based on information in the image of the eye with reference to known locations in the optical image of the spatial pattern reflected from the eye.

In another aspect, the disclosed technology can be implemented to provide a method for using optical imaging to track an eye by projecting illumination probe light that is modulated to carry a spatial pattern towards an eye of the user; operating an optical detector array with optical detectors located in the device to receive the optical reflection of the illumination probe light with the spatial pattern from the eye under illumination to produce detector signals from the optical detectors representing a detected image of the received optical reflection; processing the detector signals from the optical detector array to extract (1) an optical image of the spatial pattern reflected from the eye and (2) another optical image of the eye that overlaps with the optical image of the spatial pattern reflected from the eye; and processing the extracted optical images to determine a position or motion of the eye based on information in the image of the eye with reference to known locations in the optical image of the spatial pattern reflected from the eye. One implementation of this method includes using a periodic pattern as the spatial pattern on the illumination probe light in a predetermined geometry of known dimensions of the periodic pattern, extracting geometry and dimensions of the optical image of the spatial pattern reflected from the eye to correct an optical distortion in the optical image based on the predetermined grid geometry of known dimensions of the periodic pattern generated by the optical device, and determining the position or motion of the eye based on information in the image of the eye with reference to known locations in the optical image of the spatial pattern reflected from the eye after the optical distortion to the periodic pattern is corrected. Another implementation of this method includes using a coded speckle pattern as the spatial pattern on the illumination probe light in a predetermined geometry of known dimensions of the periodic pattern, extracting geometry and dimensions of the optical image of the spatial pattern reflected from the eye to correct an optical distortion in the optical image based on the coded speckle pattern generated by the optical device, and determining the position or motion of the eye based on information in the image of the eye with reference to known locations in the optical image of the spatial pattern reflected from the eye after the optical distortion to the coded speckle pattern is corrected.

Those and other aspects of the disclosed technology are described in greater detail in the drawings, the description and the claims.

DETAILED DESCRIPTION

Tracking a position and/or motion of a person's eye or eyes can be technically difficult for various reasons and there have been various techniques or devices designed for tracking eyes using optical methods. For example, U.S. Pat. No. 9,552,064 entitled "EYE TRACKING AND USER REACTION DETECTION" issued to Shenzhen Goodix Technology Co., Ltd. on Jan. 24, 2017 provides various examples of hardware designs and techniques for tracking eyes, the disclosure which is included as part of the priority document, U.S. Provisional Patent Application No. 62/723,476 to which this patent document claims priority. The disclosure of U.S. Pat. No. 9,552,064 is incorporated by reference as part of this patent document.

As illustrated by examples disclosed in this patent document, eye tracking can be achieved by monitoring images of an eye under optical illumination via the optical reflection of an eye and by measuring the signal strength of the optical reflection. However, the eye has a complex structure with various different biological structures, parts or components that cause optical reflections. The main locations of structures inside the eye for eye reflections include, for example, corneal reflections of light reflected off the cornea, iris reflections of light reflected off the iris, and retroreflections of light reflected off the retina. Such reflections can cause adverse effects in some applications such as the red-eye effects in photographing and may also be used in various optical systems, e.g., eye tracking devices. Additional examples of factors that can adversely affect optical reflections from an eye include eyeball surface profiles and tear accumulations in eyes. Accordingly, it can be difficult to accurately measure the signal strength of a particular optical reflection that is used for monitoring the tracking the eye movement.

The eye tracking techniques disclosed in this application by using an imaging system to capture images of unique physical features or signatures formed by biological structures of the eye, such as the iris or vessel prints on the eyeball, and to use the captured images for monitoring the movement of such unique physical features or signatures of the eye to track the eye motion. The disclosed image-tracking based on eye tracking techniques can be implemented to identify images of unique physical features or signatures of the eye for eye tracking in the presence of various reflections from the eye without being significantly affected by the presence of such reflections. The capturing of images of unique physical features or signatures of the eye may be achieved under natural lighting conditions and may be further assisted by providing illumination probe light in the imaging system to make the eyeball more visible in the illumination probe wavelength band to the imaging system to improve the capturing of the images. In implementations, the illumination probe light can be modulated to carry a pattern to provide a spatial coordinate system to assist the eye tracking operation based on use of structured illumination probe light to provide an optical reference against optical distortions and/or optical interference or noise in optical detection of reflected images for eye tracking.

The disclosed techniques in this patent document process the captured images for extracting the image of a unique physical feature of the eye and to determine and for tracking the location of the image location to monitor the movement of the eye. This imaging processing to track the eye position can reduce the reliance on the signal strength of an optical reflection in eye tracking and thus can reduce the adverse impact caused by variations and interferences on the signal quality and signal strengths of optical reflections from the eye which can carry images of one or more unique physical features or signatures of the eye. For example, once an image of the eye is captured, the captured image can be processed to identify a unique physical feature of the eye in the captured eye image, such as a particular pattern or mark in the iris or a vessel print or pattern on the eyeball. This identification and detection the image of a unique physical feature of the eye are based on a spatial shape/pattern of the unique physical feature of the eye, the relative relationships of different regions or parts with the spatial shape/pattern and the relationship of the unique physical feature of the eye with respect to other parts of the eye. A change in the optical reflection strength or the presence of background light may adversely affect accurate detection of the strength of an optical signal from a particular location on the spatial shape/pattern of the unique physical feature of the eye but generally cannot cover the presence of the spatial shape/pattern of the unique physical feature of the eye as a whole. In the present eye tracking technology, individual optical signals from all locations within the spatial shape/pattern of the unique physical feature of the eye and all other locations of the eye are captured. However, instead of relying on the signal strength of any individual received signal or a sum of receiving signals of adjacent locations or a region, the present eye tracking technology processes the overall spatial pattern of the eye carried by the captured signals from all locations of the eye to identify a sub part of the overall spatial pattern that represents the spatial shape/pattern of the unique physical feature of the eye. Accordingly, the overall presence of a unique physical feature of the eye is detectable even when light reflections or other interfering light is present in the captured image and thus can be identified and tracked despite the presence of unwanted light reflections or other interfering light. Therefore, the disclosed techniques in this patent document have some built-in immunity to variations or distortion in the optical reflections from the eyes.

In some implementations, the disclosed techniques can be implemented to provide an eye-tracking device formed on a support structure attachable to the user to include one or more probe light sources placed on the support structure to produce illumination probe light; an optical device placed on the support structure to receive the illumination probe light and to direct the illumination probe light to illuminate an eye of the user; an optical detector array placed on the support structure to include optical detectors to capture images of the eye under illumination to produce detector signals from the optical detectors; an optical imaging module placed on the support structure to image the eye onto the optical detector array; and a processor coupled to receive and process the detector signals from the optical detector array and operable to extract an optical image of a feature of the eye in each captured image of the eye and to monitor a change in position of the optical image of a feature of the eye in each captured image of the eye to track the eye.

In other implementations, the disclosed techniques can be implemented to provide a method for using optical imaging to track an eye, comprising: attaching a device to a user; projecting illumination probe light that is modulated to carry a spatial pattern towards an eye of the user; operating an optical detector array with optical detectors located in the device to receive the optical reflection of the illumination probe light with the spatial pattern from the eye under illumination to produce detector signals from the optical detectors representing a detected image of the received optical reflection; processing the detector signals from the optical detector array to extract (1) an optical image of the spatial pattern reflected from the eye and (2) another optical image of the eye that overlaps with the optical image of the spatial pattern reflected from the eye; and processing the extracted optical images to determine a position or motion of the eye based on information in the image of the eye with reference to known locations in the optical image of the spatial pattern reflected from the eye.

Examples provided below illustrate techniques for monitoring and tracking position and movement of the aiming of an eye or eyes on a display screen in real time, techniques for using the eye aiming on the display screen to place and move a cursor on the display screen, and techniques for using a physical trigger on the device to use the cursor to select, activate or interface with an object, document, software or icon on the display screen.

The disclosed technology can be implemented to provide a device having an eye-tracking feature to include a viewing device that can be attached to a user and is structured to include a display screen visible to the user when the view device is attached to the user; one or more probe light sources located in the viewing device to produce illumination probe light; an optical device located in the viewing device to receive the illumination probe light and to produce a spatial pattern on the illumination probe light and to direct to the illumination probe light with the spatial pattern into an eye; an optical detector array with optical detectors located in the viewing device to receive the optical reflection of the illumination probe light with the spatial pattern from the eye under illumination to produce detector signals from the optical detectors representing an detected image of the received optical reflection; an optical imaging module located in the viewing device to collect the optical reflection of the illumination probe light with the spatial pattern from the eye under illumination and to image the collected optical reflection onto the optical detector array; a processor coupled to receive and process the detector signals from the optical detector array and operable to extract (1) an optical image of the spatial pattern reflected from the eye and (2) an image of the eye that overlaps with the optical image of the spatial pattern reflected from the eye, and to determine a position or motion of the eye with respect to the display screen based on information in the image of the eye with reference to known locations in the optical image of the spatial pattern reflected from the eye.

Figure 1:
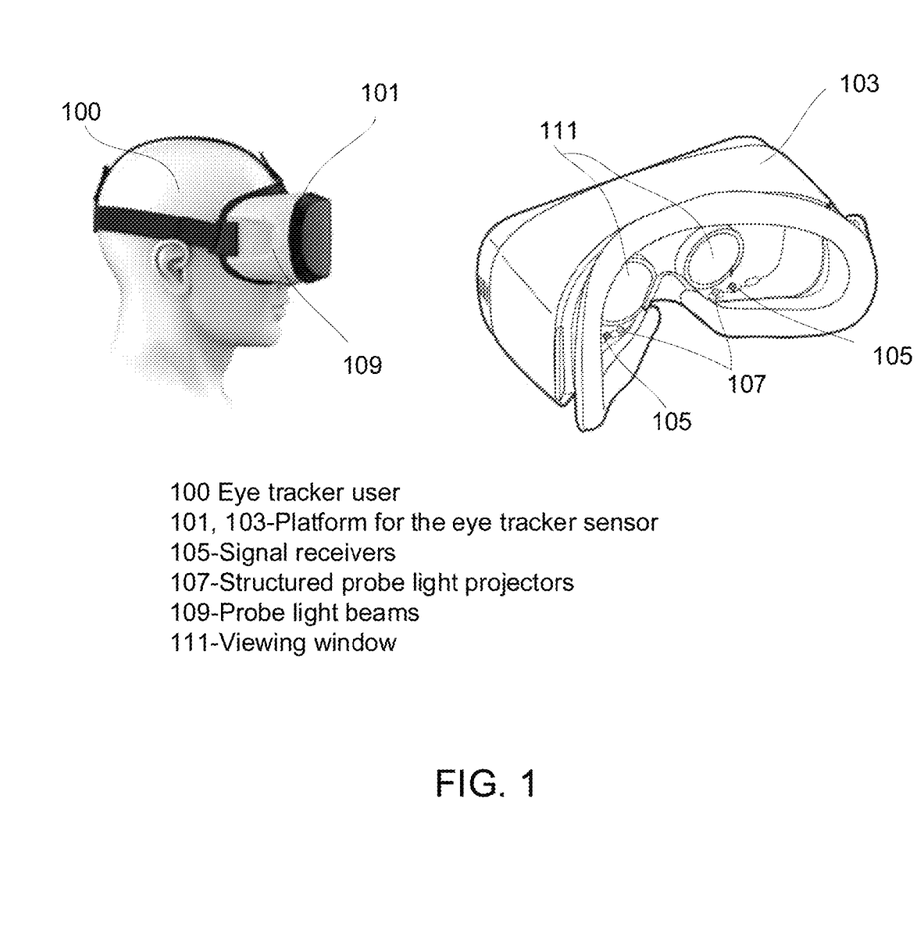
FIG. 1 depicts an eye tracking headset worn by a user, in accordance with some example embodiments.

FIG. 1 depicts a headset with goggles for monitoring eye motion that may be used in applications including VR (virtual reality), AR (augmented reality) and other applications using such a headset with goggles. A user 100 hearing such a headset look at (e.g., in a pair of VR goggles) or through (e.g., a pair of see through goggles) in one or two viewing windows 111 in the goggles, typically two viewing windows in various goggle designs: a left viewing window for the left eye and a right viewing window for the right eye. The headset 101 is designed to include an imaging system that performs eye tracking by capturing eye images for monitoring eye motion and for determining where a user is looking.

The headset 101 includes a support structure that can be attached to the user's head to hold components of the eye tracking device for imaging the user's eye for eye tracking. In this example, this support structure is the pair of goggles that can be worn by the user. The support structure can be in other forms such a wearable device to allow access to the user's eye or eyes. This support structure is used to mount or engage one or more light sources to produce probe light beams 109 and light projectors 107 that receive the probe light beams 109 and modulate the light to produce structured or patterned probe light beams 109 where each probe light beam 109 carries a spatial pattern. In implementations, each light projector 107 may be integrated or packaged with the probe light source as one unit. The light projectors 107 project the structured probe light beams onto the eyes. Optical detectors or signal receivers 105 are provided in the headset 101 and are positioned to detect probe light reflected from the user's eyes. Detection circuitry with electronics and/or a processor is provided to process the captured images by the optical detectors 105 and to determine eye motion and other features of the eye such as the pupil reaction.

Figure 2:
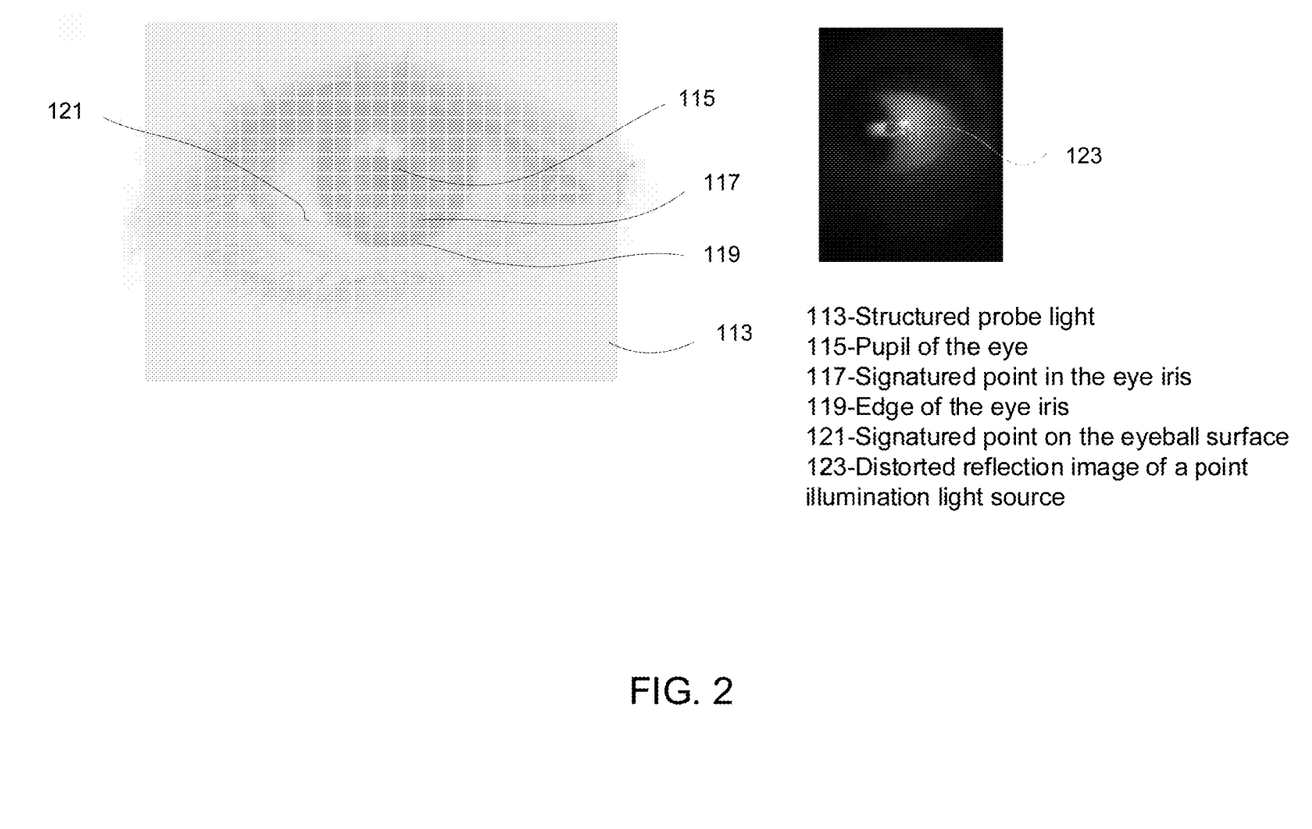
FIG. 2 depicts the use of structured light to determine eye movements, in accordance with some example embodiments.
Figure 3:
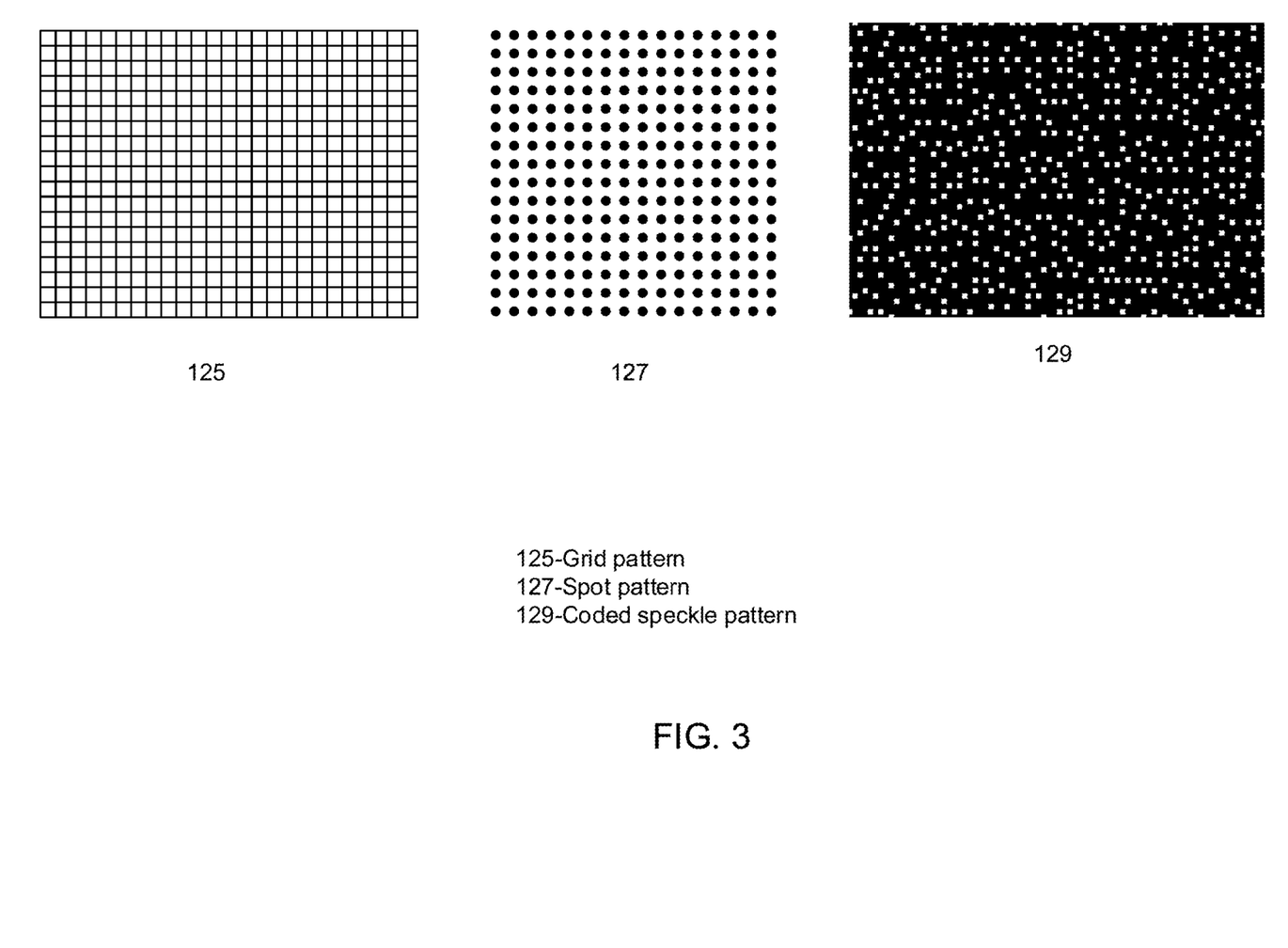
FIG. 3 depicts examples of structured light, in accordance with some example embodiments.

The technical features of the structured light beams are further described in FIGS. 2-3. The structured light beams 109 facilitate accurate detection of eye movement. The probe light projectors 107 and the signal receivers 105 can be installed at positions close to the viewing window 111. In various applications, the headset 101 can be designed to include one or two viewing windows 111 to allow the user to view objects on the other side of the viewing windows 111 such as a pair of see-through eye goggles or a pair of AR goggles where the viewing window is allows the user to see through and to display images to overlay with what the user sees. In some other applications, the headset 101 can be designed to include one or two viewing windows 111 as display screens the user to view objects displayed on the viewing window 111 such as VR goggles. In various embodiments, single or multiple light projectors and signal receivers may be used. The signal receivers may include a micro camera with enough image resolution and rapid frame rate.

FIG. 2 depicts an example of using structured probe light 113 for sensing eye movement, in accordance with some example embodiments. Probe light projectors 107 in FIG. 1 are shown here to generate the structured probe light pattern 113 where a grid like pattern is modulated onto the structured probe light 113. In some implementations, the probe light projectors 113 may include devices for forming structured light such as diffracting optical elements (DOEs), mask plates, or other imaging devices, and may include lenses or other optical components. DOEs may generate structured light using interference techniques to create regions of light enhancing constructive interference, and regions of light diminishing destructive interference. Mask plates may include devices with a patterned substrate such as glass or other material. The patterning may include light absorbing or reflecting material that blocks light according to a pattern or allows transmission of light according to a pattern. The light absorbing material may be a metal, ceramic, or other material and may be applied via photolithography, sputtering, or other deposition or printing technique. Additional techniques that may be used include scanning techniques can also be used to scan a pattern onto the eye.

The disclosed techniques to directly project structured probe light 113 onto the eye to establish easy-to-measure and reliable position coordinates by using the spatial structures or patterns in the structured probe light 113 to provide accurate determination of the position or orientation of an eye. In implementations, the probe light wavelength should be selected at an eye safe wavelength and the power of the probe light should be set a level within the eye safe level. For example, 942 nanometers (nm) wavelength light or another eye safe wavelength may be used. The output power must be set at a low-power level to ensure eye safety.

One notable feature of this disclosed eye tracking is to capture images of unique physical features or signatures of the eye, such as the iris or vessel prints on the eyeball. In implementing the disclosed technology, optical reflection signals from the eye can also be detected for eye tracking but the detection of optical reflection signals can be adversely affected due to various factors, e.g., presence of different optical reflections from the eye and user eyeball surface profiles. Detection of images of unique physical features or signatures of the eye can avoid technical complications or challenges in detecting optical reflections from an eye and can be used to enable the system to extract the unique physical features and monitor movement of such unique physical features to track the eye movement. The iris or vessel prints on the eyeball are examples of such unique physical features or signatures of the eye. The eye iris includes an inner pupillary zone with a central opening that forms the edge or boundary of the pupil and an outer ciliary zone. Each person's iris has a complex unique interwoven texture that varies from one person to another and includes signatures points such as the points 117 and 121 shown in FIG. 2. The disclosed techniques track eye motion by detecting and monitoring locations and changes in locations of one or more unique physical features in the eye, such as detecting the pupil 115 coordinates, and/or by detecting a signature point in the eye iris 117 coordinates, and/or by detecting eye iris edge 119 position, and/or by detecting signature point on eyeball surface 121 coordinates, and so on.

The positions of the reflected images of the probe light sources may be difficult to measure. As shown in FIG. 2, distorted image 123 of a point illumination light source can be seen. Reasons for the distortion may include that the eyeball's local radius at the reflection spots can be difficult to measure in real time, and/or that the reflection spots may have material accumulation, such as tear liquid accumulation, that affects the reflection. With the disclosed structured light illumination, the reference coordinates system can be recovered so that the eye motion detection is not affected by the eye surface features that affect optical reflections to the optical receivers 105 shown in FIG. 1.

FIG. 3 shows three examples of spatial patterns or structures on the structured probe light, in accordance with some example embodiments. The structured probe light in FIG. 3 may be generated by diffracting optical elements (DOEs), mask plates, or other techniques as described above. Reflections of the structured probe light may be used to establish a reference coordinate system for the eye of the user. The reference coordinate system may be used to determine eye movement. Various patterns for the structured probe light may be used. For example, a structured probe light with a grid pattern 125, or with a periodic pattern of light spots 127, or with a coded speckle pattern 129 which is not a periodic pattern, can be applied to the illumination light beams. Each of those patterns can provide a spatial coordinate system in the captured images where unique physical features or signatures of the eye in the captured images overlay with the pattern. The grid pattern 125 and the periodic pattern of light spots 127 are examples of a periodic coordinate system to provide location coordinates for identifying a location of a feature appearing in the pattern. The coded speckle pattern 129 is an example of a 2-dimensional encoded pattern that is divided into subregions of patterns and uniquely labels every subregion in the projected pattern to allow a position within the whole pattern to be reconstructed uniquely from a small local window of the pattern. Such encoded patterns can e used for 3-D pattern sensing applications such as Apple's face ID. See, for example, "Design and quality metrics of point patterns for coded structured light illumination with diffractive optical elements in optical 3D sensors" by Ralf Vandenhouten, Andreas Hermerschmidt and Richard Fiebelkorn, in Proc. SPIE 10335, Digital Optical Technologies 2017, 1033518 (26 Jun. 2017). Accordingly, a position of an eye feature in the captured image can be determined within this spatial coordinate system provided by the pattern. Each of the structured light patterns 125, 127, or 129 may be generated via the methods described above including DOEs, masks, or other techniques.

Therefore, in implementations, the structured probe light is used to: (1) to establish a spatial position reference or a reference coordinate system for determining positioning of unique physical features or signatures of the eye in captured images; (2) to provide background illumination to the eye to facilitate detecting images of unique physical features or signatures of the eye; and (3) to restrict the effect of potentially interfering light signals, such as light from a display screen being seen by the user, background light or other light from the environment.

In implementing the disclosed eye tracking technology, a coded speckle pattern can be used as the spatial pattern on the illumination probe light in a predetermined geometry of known dimensions of the periodic pattern where the geometry and dimensions of the optical image of the spatial pattern reflected from the eye can be extracted to correct an optical distortion in the optical image so that the position or motion of the eye can be determined based on information in the image of the eye with reference to known locations in the optical image of the spatial pattern reflected from the eye.

Figure 4:
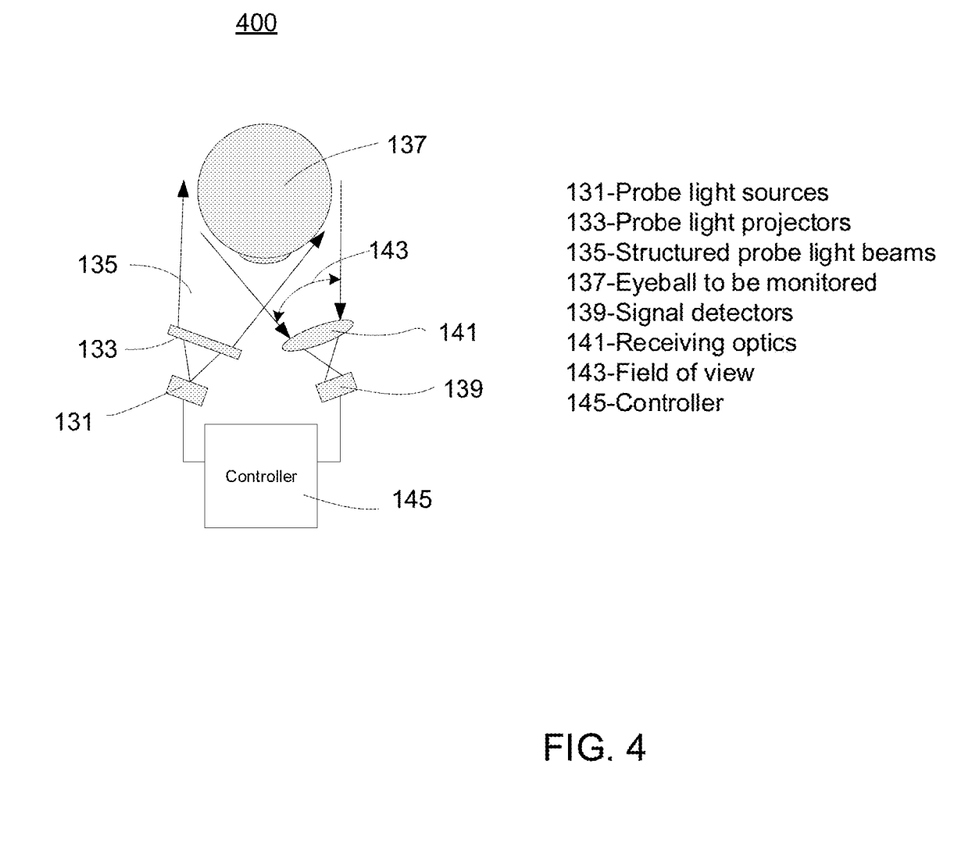
FIG. 4 depicts an example of an eye tracking apparatus, in accordance with some example embodiments.

FIG. 4 shows an example of an eye-tracking device 400 for determining the position of an eye 137 using an optical imaging system with illumination of structured light. This eye-tracking device 400 in the illustrated example is for monitoring one eye and two such devices can be used to track movements of two eyes of a user, such as for implementing the application system with a pair of goggles shown in FIG. 1.

The device 400 includes one or more light sources 131 to produce illumination probe light, one or more structured light devices, light modulators or light projectors 133 to superimpose a desired spatial pattern on the illumination probe light, receiving optics 141, light detector(s) 139, and controller 145.

The one or more light sources 131 are located separately from the light detector(s) 139 and may include, in some implementations, light emitting diodes (LEDs), laser diodes (LDs), vertical-cavity surface-emitting lasers (VCSELS), or other suitable types of light sources. The one or more probe light projectors 133 are located in the optical path of the probe light to convert the probe light to structured probe light beams 135 and may include DOEs, masks, and other techniques as described above. The structured probe light beams 135 are projected onto the eye 137 to be monitored. The receiving optics 141 and signal detectors 139 are located in an optical path of the reflection of the structured probe light 135 from the eye and the eye is located in the field of view 143 of the receiving optics 141 and signal detectors 139. The signal detectors 139 may be have a single light-sensitive element or multiple light-sensitive elements in an array such as a camera, an imaging detector, an array of optical detectors, or other array devices for light sensing. The receiving optics 141 generate the images of the eye. The controller 145 controls the light probe light sources 131 and signal detectors 139 and communicates with another platform such as a desktop/laptop/tablet computer or other central controlling device.

In one implementation, the device 400 can be attached to a user and is structured to include a display screen visible to the user when the view device is attached to the user. The eye tracking feature in this device is to track the eye's gazing position relative to the display screen. For example, in VR or AR goggles, this display screen is included in the viewing window 111 in the example shown in FIG. 1. In other applications, this display screen can be the display on a smartphone, a tablet, a laptop or a TV. In operation, a processor in the controller 145 is coupled to receive and process the detector signals from the optical detector or detector array 139 and is operated to extract the images of the eye under monitoring which contains images of unique physical features or signatures of the eye. The processor in the controller 145 detects and tracks the position of an image of a unique physical feature of the eye is extracted within the capture image to track the motion of the eye. In implementations, two or more unique physical features of the eye may be monitored for eye tracking. The position of the image of a unique physical feature of the eye can be determined in various ways. For example, when the illumination probe light is modulated to carry a pattern as a structured probe light beam as shown in the examples in FIG. 3, the processor in the controller 145 can use either the coordinates in the pattern (e.g., pattern 125 or 127 in FIG. 3) to provide the location information of the tracked unique physical feature of the eye by detecting (1) an optical image of the spatial pattern carried in the reflected probe light from the eye and (2) an optical image of the tracked unique physical feature of the eye that overlaps with the optical image of the spatial pattern carried in the reflected probe light from the eye. If the probe light is modulated to carry a coded 2D pattern as illustrated in the example 129 in FIG. 3, the processor in the controller 145 can determine the location information of the tracked unique physical feature of the eye within the whole pattern to be reconstructed uniquely from a small local window of the pattern that is detected by the one or more signal detectors 139.

The position of the image of a unique physical feature of the eye can be determined by using the optical sensor pixel positions in the receiving sensor array as a coordinates system. In this method, the sensor position information (e.g., the row position and column position of a pixel in the sensor array) for sensor pixels capturing a unique physical feature of the eye can be used as to locate the tracked unique physical feature of the eye for tracking the eye movement. When the eye moves, the position of the extracted optical image of a particular physical feature of the eye will change which cause a change in row and column positions of optical detectors in the optical detector array that capture the extracted optical image. Under this design, the illumination probe light can be a beam without carrying any pattern in some implementations.

Figure 5:
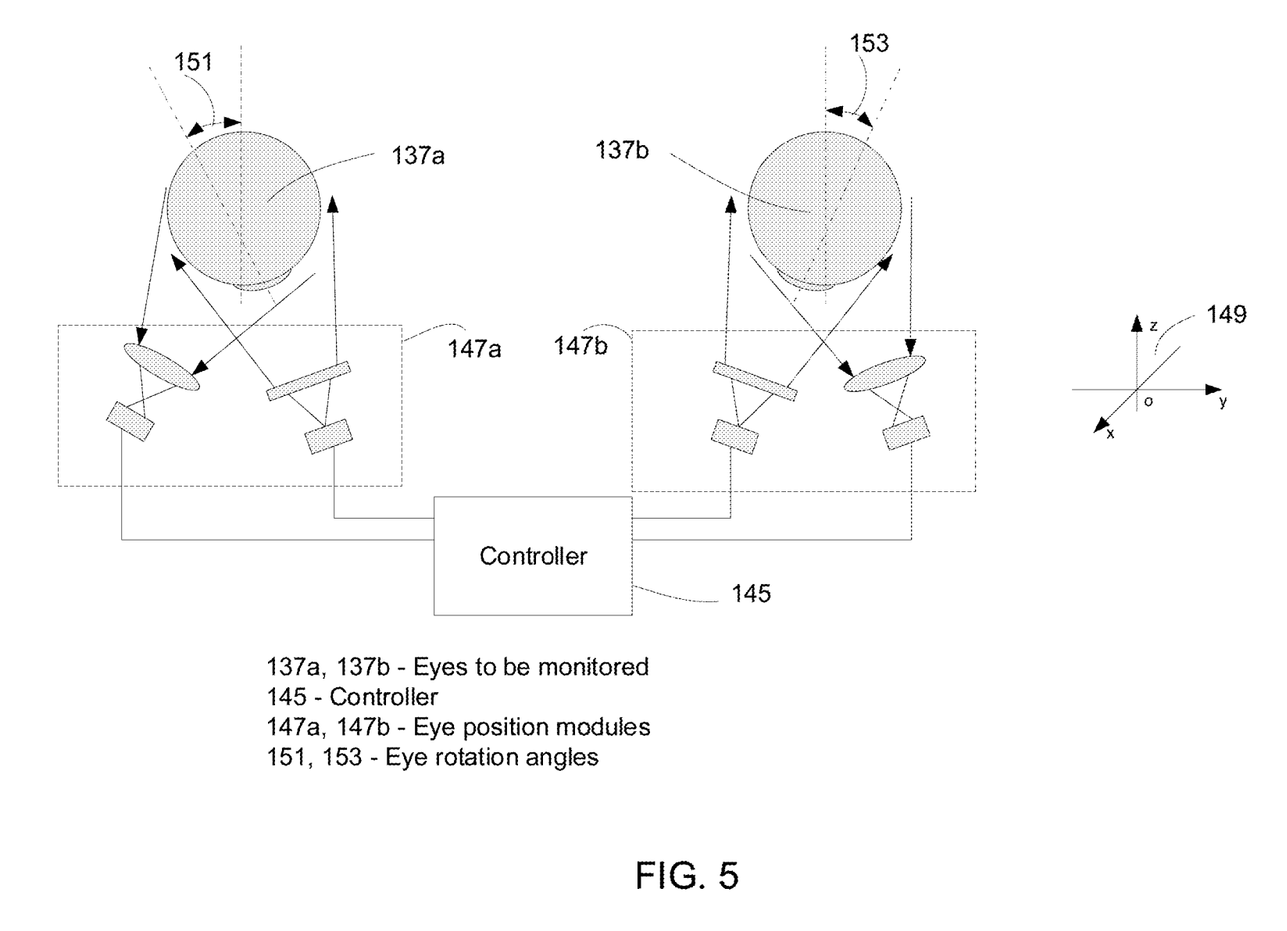
FIG. 5 depicts an example of an eye tracking system, in accordance with some example embodiments.

Therefore, the disclosed eye tracking technology in this patent document can be implemented as the following eye tracking method in operating a device such as a computer system, a mobile device or other devices. First, illumination probe light is provided to illuminate an eye of the user. Second, an optical detector array with optical detectors located in the device is operated to receive the optical reflection of the illumination probe light with the spatial pattern from the eye under illumination to produce detector signals from the optical detectors representing a detected image of the received optical reflection. The detector signals from the optical detector array are processed to produce an optical image of the eye and to an optical image of a selected feature of the eye within the captured image of the eye. and to monitor a change in position of the optical image of a the selected feature of the eye in each the captured image of the eye to track the eye FIG. 5 depicts an eye position sensing system for two eyes which can be used in various applications such as the goggle device shown in FIG. 1. Eye position module 147a measures the position or the user's right eye 137a, and eye position module 147b measures the position or the user's right eye 137b. Eye position modules 147a and 147b determine the positions of the two eyes 137a and 137b, such as a position in a 3-D coordinate system O-XYZ 149.

Eye position modules 147a and 147b, or controller 145, can be configured to determine the distance between eyes 137a and 137b within the coordinate system 149. The eye position modules 147a and 147b determine the eye rotation angles of each eye. Eye position module 147a determines eye rotation angle 151 of right eye 137a and eye position module 147b determines eye rotation angle 153 of left eye 137b. Eye position modules can also be used to determine for each eye the apertures of the pupil, eye flashing movements, eyelid blink, and so on. The foregoing detected eye parameters are collected to calculate the motion of each eye.

The eye position modules 147a and 147b may include cameras that can generate high-resolution of the eye including the eye iris. High-resolution imaging of an eye iris can be used to establish a bio-identifier map for the user. The bio-identifier map helps to simplify the calibration of the future usage by same user.

The motion of each eye reflects a gaze point indicating where the user is looking within the user's field of view. The gaze point may be used as feedback to a computer that can be used as input information to the computer. For example, the user may be presented with a display generated image or multiple images. The gaze point can be used to determine where in the image or at what image the user has focused his/her attention. In response to the user's gaze point, the computer may alter the image presented to the user or offer selections that the user can activate with a user-activated switch. The eye tracker signals can also be used in other aspects, such as in game control interaction, and so on.

Further features can be analyzed based on the signals, such as the emotion of the user. For example, the iris diameter or changes in iris diameter may reflect an emotion of the user or a change in emotion. Also reflective of emotion may be the portion of the eyes visible to the eye position modules. Emotion may be reflected by a narrowing or opening of the eyes. For example, an angry user may have the tendency to narrow their eyes by squinting.

Figure 6:
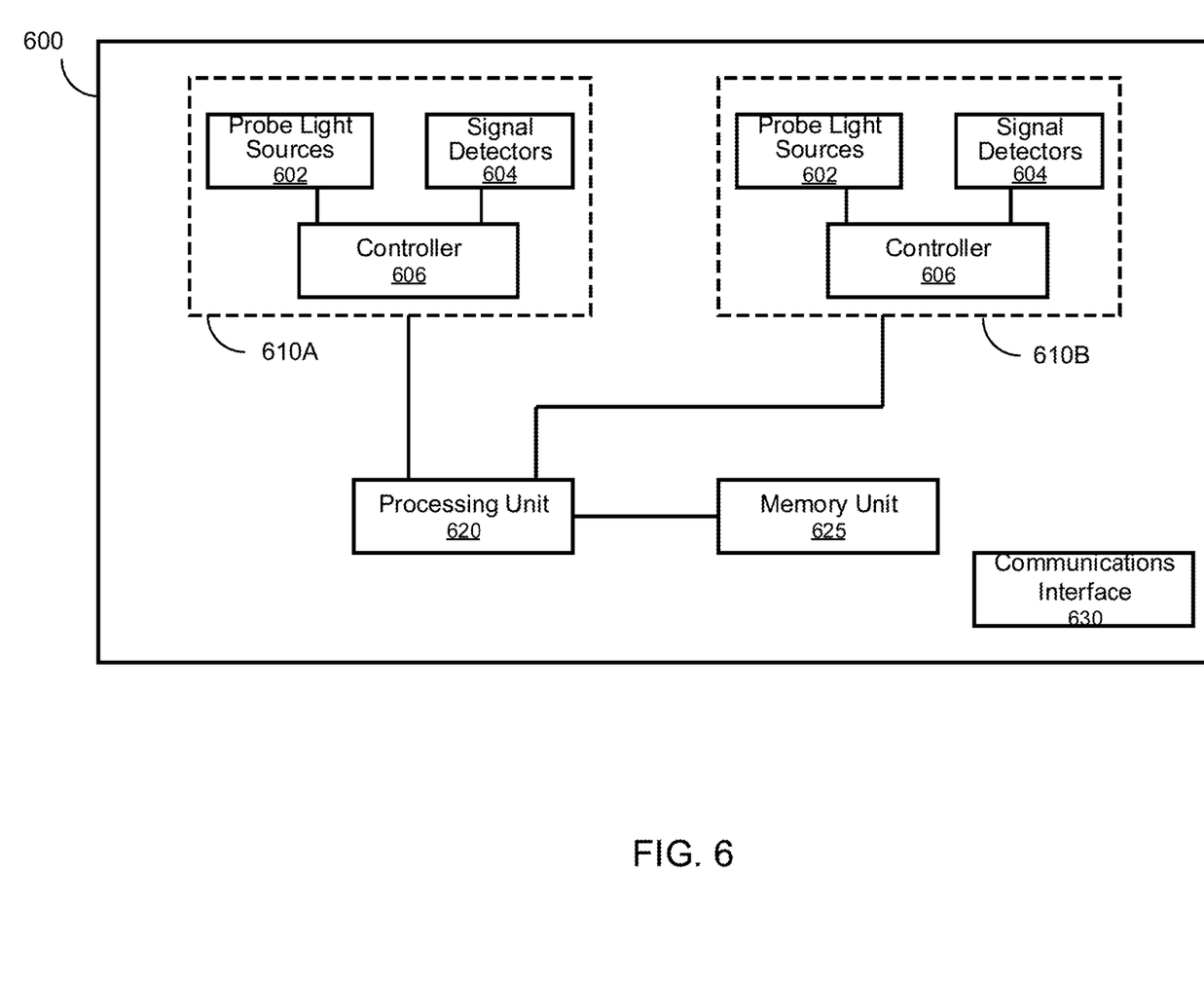
FIG. 6 depicts an example apparatus for eye tracking using the disclosed technology, in accordance with some example embodiments.

FIG. 6 depicts an eye position monitoring apparatus 600, in accordance with some example embodiments. The apparatus includes two eye position devices 610A and 610B and a processor 620 and memory 625. Each eye position device includes probe light sources 602, signal detectors 604 and a controller 606 as described above with respect to FIGS. 1-5. Communications interface 630 may be a wired or wireless interface to a desktop/laptop computer or other central controlling device.

In some example embodiments, a viewing device can be included in a headset such as headset 101. The viewing device may include a display screen visible to the user through the headset 101 when the view device is attached to the user. The headset may include one or more probe light sources located in the viewing device, and an optical device located in the viewing device to receive the illumination probe light and generate structured probe light which may include a spatial pattern on the illumination probe light which may be directed into an eye. The spatial pattern may be a periodic spatial pattern. The headset may further include an optical detector array with optical detectors located in the viewing device to receive the optical reflection of the illumination probe light with the spatial pattern from the eye to produce detector signals from the optical detectors representing a detected image of the received optical reflection. The headset may include an optical imaging module located in the viewing device to collect the optical reflection of the illumination probe light and to image the collected optical reflection onto the optical detector array. The optical detector array may include a camera as described above.

The eye tracking technology disclosed here can be used in various applications, including determining and tracking a user's eye focus on a display to obtain information of a user's attention on displayed items on the screen. In addition, based on the eye tracking, a cursor or focus indicator can be generated on the display screen based on the tracked gaze or focus point of the user's eye or eyes. The generated cursor or focus indicator can be used to select, activate, or interact with a software application, a document, a graphical user interface (GUI) or an icon or object on the GUI to cause a desired action, operation or effect. The generated cursor or focus indicator can be used in combination with one or more additional user input mechanisms such as operational buttons, switches or triggers on the device. The cursor or focus indicator control based on eye tracking described in this document can be implemented as an "eye mouse" to replace a physical mouse or pointer device to control the movement or position of the cursor on the display screen. In mobile or hand-held devices, this "eye mouse" can be used to enable a one-handed operation or control various operations and functions via the display screen.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. An eye-tracking device, comprising:
a support structure attachable to a user;
one or more probe light sources placed on the support structure to produce illumination probe light;
an optical device placed on the support structure to receive the illumination probe light and to direct the illumination probe light to illuminate an eye of the user, wherein the optical device includes an optical projector that modulates the illumination probe light to carry a pattern as a spatial position reference and to project the illumination probe light with the pattern over the eye without scanning the illumination probe light;
an optical detector array placed on the support structure to include optical detectors to capture images of the eye under illumination to produce detector signals from the optical detectors;
an optical imaging module placed on the support structure to image the eye onto the optical detector array and to collect and image optical reflection of the illumination probe light with the pattern of the spatial position reference from the eye onto the optical detector array; and
a processor coupled to receive and process the detector signals including the captured images from the optical detector array and operable to extract from the captured images an optical signature produced by a unique physical feature of the eye comprising a complex interwoven texture of an iris that is unique to each person wherein the complex interwoven texture includes signature points that are unique to each person in each captured image of the eye based on the pattern in the illumination probe light as the spatial position reference to determine positions of the signature points of the eye in each captured image of the eye and to monitor a change in the positions of the signature points of the eye in each captured image of the eye to track the eye, wherein the processor is operable to determine the positions of the signature points of the eye in each captured image of the eye based on row and column positions of optical detectors in the optical detector array that capture the captured images, wherein as the eye moves the positions of the signature points of the eye change causing change in the row and the column positions of optical detectors in the optical detector array that capture the signature points of the eye, wherein the processing the detector signals from the optical detector array further tracks the eye by determining a position of the eye in a three-dimensional coordinate system based on the illumination probe light with the pattern of the spatial position reference.

2. The device as in claim 1, wherein the optical device includes an optical projector that modulates the illumination probe light to carry a pattern as a spatial position reference for the processor to determine the position of the optical image of a feature of the eye in each captured image of the eye.

3. The device as in claim 2, wherein the optical device includes an optical projector that modulates the illumination probe light to carry a periodic spatial pattern to determine the position of the optical image of a feature of the eye in each captured image of the eye.

4. The device as in claim 2, wherein the optical device includes an optical projector that modulates the illumination probe light to carry a coded non-periodic pattern to determine the position of the optical image of a feature of the eye in each captured image of the eye.

5. The device as in claim 2, wherein the optical projector includes a diffractive optical element.

6. The device as in claim 1, wherein the support structure attachable to the user is a pair of goggles.

7. The device as in claim 1, wherein the processor is structured to detect one or more images of an iris of the eye as part of the optical signature to determine a bio-identifier map for the user.

8. The device as in claim 1, wherein the processing the detector signals from the optical detector array further determines an aperture of a pupil of the eye, eye flashing movements, and eyelid blink movements.

9. A method for using optical imaging to track an eye, comprising:
attaching a device to a user;
projecting illumination probe light to illuminate an eye of the user;
modulating the illumination probe light to carry a pattern as a spatial position reference so that the illumination probe light is projected onto the eye with the pattern over the eye without scanning the illumination probe light;
operating an optical detector array with optical detectors located in the device to receive an optical reflection of the illumination probe light with the spatial pattern from the eye under illumination to produce detector signals from the optical detectors representing a detected image of the eye;
operating an optical imaging module in an optical path of the optical reflection from the eye to the optical detector array to image the eye onto the optical detector array and to collect and image the optical reflection of the illumination probe light with the pattern of the spatial position reference from the eye onto the optical detector array; and processing the detector signals from the optical detector array to generate an optical image of the eye and to identify an optical signature produced by a unique physical feature comprising a complex interwoven texture of an iris that is unique to each person wherein the complex interwoven texture includes signature points that are unique to each person within the detected image of the eye based on the pattern as the spatial position reference in an optical refection of the illumination probe light to determine the positions of the signature points of the eye and to monitor a change in the positions of the signature points of the eye in the detected image of the eye to track the eye, wherein the processing determines the positions of the signature points of the eye in each captured image of the eye based on row and column positions of optical detectors in the optical detector array that capture the captured images, wherein as the eye moves the positions of the signature points of the eye change causing change in the row and the column positions of optical detectors in the optical detector array that capture the signature points of the eye, wherein the processing the detector signals from the optical detector array further tracks the eye by determining a position of the eye in a three-dimensional coordinate system based on the illumination probe light with the pattern of the spatial position reference.

10. The method as in claim 9, comprising:

modulating the illumination probe light to carry a spatial pattern to illuminate the eye of the user;

operating the optical detector array to image the eye;

processing the detector signals from the optical detector array in imaging the eye to generate (1) an optical image of the spatial pattern in the modulated illumination probe light reflected from the eye and (2) the optical image of the eye that overlaps with the optical image of the spatial pattern; and processing the optical images to determine a position or motion of the eye based on information of the optical image of the signature points of the eye within the generated image of the eye with reference to known locations in the optical image of the spatial pattern reflected from the eye.

11. The method as in claim 10, comprising:

using a periodic pattern as the spatial pattern on the illumination probe light, wherein the periodic pattern includes a pattern of spots or isolated patterns.

12. The method as in claim 10, comprising:

using a coded pattern as the spatial pattern on the illumination probe light.

13. An eye-tracking device, comprising:

a viewing device that can be attached to a user and is structured to include a display screen visible to the user when the view device is attached to the user;

one or more probe light sources located in the viewing device to produce illumination probe light;

an optical device located in the viewing device to receive the illumination probe light and to produce a spatial pattern on the illumination probe light and to direct the illumination probe light with the spatial pattern into an eye without scanning the illumination probe light;

an optical detector array with optical detectors located in the viewing device to receive an optical reflection of the illumination probe light with the spatial pattern from the eye under illumination to produce detector signals from the optical detectors representing a detected image of the optical reflection;

an optical imaging module located in the viewing device in an optical path of the optical reflection from the eye to the optical detector array to collect the optical reflection of the illumination probe light with the spatial pattern from the eye under illumination and to image a collected optical reflection onto the optical detector array and to image the eye onto the optical detector array; and a processor coupled to receive and process the detector signals from the optical detector array and operable to extract (1) an optical image of the spatial pattern reflected from the eye, (2) an signature produced by a unique physical feature of the eye comprising a complex interwoven texture of an iris that is unique to each person wherein the complex interwoven texture includes signature points that are unique to each person that overlaps with the optical image of the spatial pattern reflected from the eye, and to determine motion of the eye with respect to the display screen based on information in the signature points of the eye with reference to known locations in the optical image of the spatial pattern reflected from the eye, (3) operable to determine positions of the signature points of the eye in each captured image of the eye based on row and column positions of optical detectors in the optical detector array that capture the captured images, wherein as the eye moves the positions of the signature points of the eye change causing change in the row and the column positions of optical detectors in the optical detector array that capture the signature points of the eye, and (4) operable to further determine the motion of the eye by determining a position of the eye in a three-dimensional coordinate system based on the illumination probe light with the pattern of the spatial position reference.

14. The device as in claim 13, wherein the optical device located in the viewing device is configured to generate a periodic pattern as the spatial pattern on the illumination probe light in a predetermined geometry of known dimensions of the periodic pattern, wherein the processor is structured to extract geometry and dimensions of the optical image of the spatial pattern reflected from the eye to correct an optical distortion in the optical image based on predetermined grid geometry of known dimensions of the periodic pattern generated by the optical device, and wherein the processor is structured to determine the position or motion of the eye with respect to the display screen based on information in the image of the eye with reference to known locations in the optical image of the spatial pattern reflected from the eye after the optical distortion to the periodic pattern is corrected.

15. The device as in claim 14, wherein the periodic pattern includes a grid pattern, or a pattern of spots or isolated patterns.

16. The device as in claim 14, wherein the optical device located in the viewing device is configured to generate a coded speckle pattern as the spatial pattern on the illumination probe light in a predetermined geometry of known dimensions of the periodic pattern, wherein the processor is structured to extract geometry and dimensions of the optical image of the spatial pattern reflected from the eye to correct an optical distortion in the optical image based on the coded speckle pattern generated by the optical device, and wherein the processor is structured to determine the position or motion of the eye with respect to the display screen based on information in the image of the eye with reference to known locations in the optical image of the spatial pattern reflected from the eye after the optical distortion to the coded speckle pattern is corrected.

17. The device as in claim 13, wherein the processor is structured to extract one of a biological structure selected from different biological structures of the eye to determine the position or motion of the eye with respect to the display screen based on information in the image of the eye with reference to known locations of the selected biological structure in the optical image of the spatial pattern reflected from the eye.

18. The device as in claim 17, wherein the processor is structured to, in addition to the selected biological structure of the eye, extract a second biological structure of the different biological structures of the eye to determine the position or motion of the eye with respect to the display screen based on information in the image of the eye with reference to known locations of both the selected biological structure and the second selected biological structure in the optical image of the spatial pattern reflected from the eye.

19. The device as in claim 13, wherein the viewing device includes a virtual reality (VR) device such as a pair of VR goggles or an augmented reality (AR) device such as a pair AR goggles.

20. The device as in claim 1, wherein the optical signature is formed by a biological structure of the eye comprising one or more of a pattern or mark of the iris, a blood vessel print pattern on the eye, and wherein the processor detects and monitors the positions and the changes in the positions of the signature points, pupil coordinates, or detects an edge position of the iris.

* * * * *